United States Patent Office 2,886,453
Patented May 12, 1959

2,886,453
SPARK PLUG INSULATORS CONTAINING ThO₂

Harry G. Schurecht, Detroit, Mich., assignor to Champion Spark Plug Company, Toledo, Ohio, a corporation of Delaware No Drawing. Application September 28, 1954
Serial No. 458,944

2 Claims. (Cl. 106—39)

This invention relates to spark plug insulators containing $ThO_2$, and, more particularly, to insulators produced by firing particular blends of ceramic materials including $ThO_2$, which insulators are highly resistant to fouling by lead compounds present in most high octane fuels, have excellent dielectric properties at high temperatures, and have good thermal conductivities.

It has been previously suggested that a mixture of 10 parts by weight of thorium oxide and one part by weight of magnesia can be used to produce a porous ceramic article useful in the manufacture of metallic glow filaments for incandescent electric lamps. It has also been suggested that thorium oxide is useful in the production of high alumina spark plug insulators, because, in common with $CeO_2$, $La_2O_3$, $ZrO_2$ and $TaO_2$, it induces the re-crystallization of corundum to an extremely dense structure and, also, imparts its own physical characteristics to the structure.

With increased use of tetra ethyl lead as a gasoline additive in internal combustion engine fuels, a difficulty which has been denominated "lead fouling" has been encountered in spark plug insulators. The term "lead fouling," as applied to a spark plug insulator, is used herein in its usual sense to refer to the formation of electrically conducting deposits comprising lead on the nose portion of the insulator which is exposed in the firing chamber of the engine. In extreme cases lead fouling will make an ordinary spark plug completely useless because discharge through the contamination takes place almost to the exclusion of the ordinary spark discharge between the electrodes.

The present invention is based upon the discovery that spark plug insulators resistant to lead fouling can be produced by firing a blend, in particular proportions, of $ThO_2$ and various other materials.

According to the invention a ceramic spark plug insulator resistant to corrosion by fuels containing tetra ethyl lead is provided. At least the surface of such an insulator, at the firing end, is produced by sintering a composition which consists essentially of from 55 percent to 98 percent of $ThO_2$, from 0.5 percent to 45 percent of MgO, about 1 percent of CaO, not more than 5 percent of $SiO_2$, and not more than 45 percent of $Al_2O_3$.

The terms "percent" and "parts" are used herein, and in the appended claims, to refer to percent and parts by weight, unless otherwise indicated.

Spark plug insulators according to the invention produced by firing a composition in which MgO is present in an amount ranging from about 1 percent to about 39.6 percent have been found to have optimum properties, and are, therefore, preferred. It is also preferred that $Al_2O_3$ constitute from about 30 percent to about 40 percent of the composition.

Sintered ceramic spark plug insulators resistant to corrosion by fuels containing tetra ethyl lead, at least the surface of which at the firing end is produced by sintering a composition as previously defined herein, can be produced, for example, according to the procedures set forth in the following example, which is presented solely for the purpose of further illustrating and disclosing the invention, and is in no way to be construed as a limitation thereon.

EXAMPLE

Sintered ceramic electrical insulators were prepared from various compositions including $ThO_2$, MgO, alumina and silica. In all cases, a blend of ingredients was wet milled to substantial uniformity (usually for 18 hours), was then dried and mixed with 4 percent of paraffin wax, based upon the weight of dry ingredients, dissolved in carbon tetrachloride. The wax was thoroughly mixed with the dry ingredients, and the carbon tetrachloride volatilized, leaving the wax uniformly dispersed throughout the composition. Test cylinders, about one-half inch in diameter and approximately one-half inch in length, were then pressed from the mixed composition using a total pressure of 10,000 pounds. These cylinders were then fired to cone 16 or to cone 31. The bodies so prepared were tested to determine their suitability for use as spark plug insulators. The electrical resistance of the one-half inch cylinders was determined at various temperatures. Although the resistance required of insulators for spark plugs depends to a certain extent upon the design of the plug, the minimum acceptable value should be at least one megohm at 1200° F. for such cylinders. Another standard test was conducted to compare the thermal diffusivities of insulators produced from different compositions: The test involved placing a crystal of citric acid on one end of the sintered one-half inch cylinder, and immersing the other end of the cylinder in a 600° F. metal bath to a depth of ⅛ inch. The number of seconds required for heat conducted through the insulator to melt the citric acid crystal, which melts at 307.4° F., is reported in the table herein as "thermal diffusivity," and is an inverse function of thermal conductivity. To be satisfactory for spark plug use an insulator should have a thermal diffusivity, so measured, not greater than fifty seconds, and preferably not greater than forty seconds. The adequacy of the firing under a set of standard conditions is also an important characteristic of a ceramic composition since it determines porosity, strength and other properties. This was measured by a standard dye test. In the table herein, the abbreviation "Mat." is used to indicate that the body was matured and completely satisfactory in this respect; "O.B." to indicate that it was over-burned; "U.F." that it was under-fired; and "S," preceding either "U.F." or "O.B.," that under-firing or over-burning was slight. In general, an over-burned or under-fired body can be corrected by varying the flux content or the firing temperature.

Typical test results for bodies produced by firing compositions containing the above-listed ingredients are presented in the following table:

Table

| Body No. | Parts | | | | | | Dye Test | |
|---|---|---|---|---|---|---|---|---|
| | ThO₂ | Al₂O₃ | MgO | SiO₂ | CaO | Other | Cone 16 | Cone 31 |
| 1 | 86.8 | 9.7 | 0.6 | 2.2 | 0.8 | | S.U.F. | Mat. |
| 2 | 77.2 | 19.3 | 0.6 | 2.2 | 0.8 | | U.F. | S.U.F. |
| 3 | 67.5 | 29.0 | 0.6 | 2.2 | 0.8 | | U.F. | S.U.F. |
| 4 | 57.9 | 38.6 | 0.6 | 2.2 | 0.8 | | U.F. | S.U.F. |
| 5 | 96.5 | 0.4 | 0.6 | 2.2 | 0.8 | | Mat. | O.B. |
| 6 | 87.5 | 2.3 | 2.4 | 2.2 | 0.8 | (¹) | Mat. | O.B. |
| 7 | 86.5 | 2.1 | 0.6 | 2.2 | 0.8 | (²) | Mat. | O.B. |
| 8 | 86.5 | 0.4 | 4.1 | 2.2 | 0.8 | (³) | S.U.F. | Mat. |
| 9 | 86.5 | 0.4 | 5.6 | 2.2 | 0.8 | (⁴) | Mat. | Mat. |
| 10 | 48.3 | 0.4 | 33.9 | 2.2 | 0.8 | | Mat. | |
| 11 | 57.9 | 0.4 | 27.2 | 2.2 | 0.8 | | Mat. | Mat. |
| 12 | 67.5 | 0.4 | 20.6 | 2.2 | 0.8 | | Mat. | O.B. |
| 13 | 77.2 | 0.4 | 13.9 | 2.2 | 0.8 | | Mat. | Mat. |
| 14 | 86.8 | 0.4 | 7.3 | 2.2 | 0.8 | | Mat. | Mat. |

¹ Also contained 1.6 parts of $B_2O_3$ and 3.4 parts of $SnO_2$.
² Also contained 1.4 parts of $B_2O_3$, 3.2 parts of $SnO_2$, and 3.4 parts of ZnO.
³ Also contained 6.5 parts of ZnO.
⁴ Also contained 5 parts of $TiO_2$.

| Body No. | Electrical Resistance (Megohms) | | | | | | Thermal Diffusivity, Seconds | |
|---|---|---|---|---|---|---|---|---|
| | Cone 16 | | | Cone 31 | | | | |
| | 1,200° F. | 1,400° F. | 1,500° F. | 1,200° F. | 1,400° F. | 1,500° F. | Cone 16 | Cone 31 |
| 1 | | 1.7 | | | 9.5 | | 24.0 | 20.6 |
| 2 | | 4 | | | 18 | 7 | 23.4 | 21.3 |
| 3 | | 12 | | | 38 | | 24.0 | 20.2 |
| 4 | | 21 | | | 55 | 23 | 22.6 | 19.6 |
| 5 | | | | 100+ | 48 | | 8.7 | 7.8 |
| 6 | | | | | 18 | | 25.0 | 27.6 |
| 7 | | | | | 20 | | 27.6 | 28.7 |
| 8 | | | | | 1 | | 22.8 | 23.1 |
| 9 | | | | | 1 | | 20.8 | 22.4 |
| 10 | | 8 | | | | | 22.7 | |
| 11 | 72 | | | | | | 26.4 | |
| 12 | 72 | | | | | | 25.3 | |
| 13 | 2 | | | | | | 30.3 | |
| 14 | 72 | | | | | | 31.6 | |

The data presented in the foregoing table show that ceramic insulators produced by sintering a composition which consists essentially of from 55 percent to 98 percent of $ThO_2$, from 0.5 percent to 39.6 percent of MgO, about 1 percent of CaO, not more than 45 percent of $Al_2O_3$, and not more than 5 percent of $SiO_2$ have the thermal conductivity and dielectric properties at high temperatures requisite for spark plug insulators. In addition, they are resistant to lead fouling. Such insulators can be used per se as spark plug insulators, or the indicated composition can be used to produce an engobe coating on at least the firing end of a previously fired insulator. To produce such an engobe coating the indicated composition is formed into a slip with water, applied as a coating to at least a part of the surface of a spark plug insulator, and the resulting coated insulator fired to sinter the engobe coating. The resulting engobe coated insulator has the high resistance to lead fouling characteristic of the engobe coating, and the dielectric properties thereof. The high thermal conductivity of the engobe coating facilitates the conduction of heat from the firing end of the insulator, thereby assisting in the prevention of preignition in an associated internal combustion engine.

It will be apparent that various changes and modifications can be made from the specific details disclosed and discussed above without departing from the spirit of the attached claims. Limited amounts of various other oxide materials also can be present in compositions fired to produce a ceramic spark plug insulator according to the invention, as in the case of bodies 6 through 9 in the table. It is not necessary to use the pure oxides in all instances as is recited in the above example and in the claims, as hydroxides, carbonates, and other compounds which yield the oxides upon firing are equally effective.

This is a continuation-in-part of application Serial No. 20,102, filed April 9, 1948, and now abandoned.

What I claim is:

1. A ceramic spark plug insulator resistant to corrosion by fuels containing tetraethyl lead, at least the surface of which at the firing end is produced by sintering a composition which consists essentially of from 48.3 parts to 96.5 parts of $ThO_2$, from 0.6 part to 33.9 parts of MgO, about 0.8 part of CaO, from 0.4 part to 38.6 parts of $Al_2O_3$, and at least about 2.2 parts of $SiO_2$, the total $SiO_2$ not to exceed 5 percent of the composition.

2. A ceramic spark plug insulator resistant to corrosion by fuels containing tetraethyl lead, at least the surface of which at the firing end is produced by sintering a composition which consists essentially of from 48.3 parts to 96.5 parts of $ThO_2$, from 0.6 part to 33.9 parts of MgO, about 0.8 part of CaO, from 0.4 part to 38.6 parts of $Al_2O_3$, and about 2.2 parts of $SiO_2$.

References Cited in the file of this patent

UNITED STATES PATENTS

| 1,047,541 | Lederer | Dec. 17, 1912 |
| 2,152,655 | McDougal | Apr. 4, 1939 |

FOREIGN PATENTS

| 403,903 | France | of 1909 |
| 11,771 | Great Britain | of 1912 |